(No Model.)
U. SHAEFFER.
CORN PLANTER.
No. 512,626.
Patented Jan. 9, 1894.
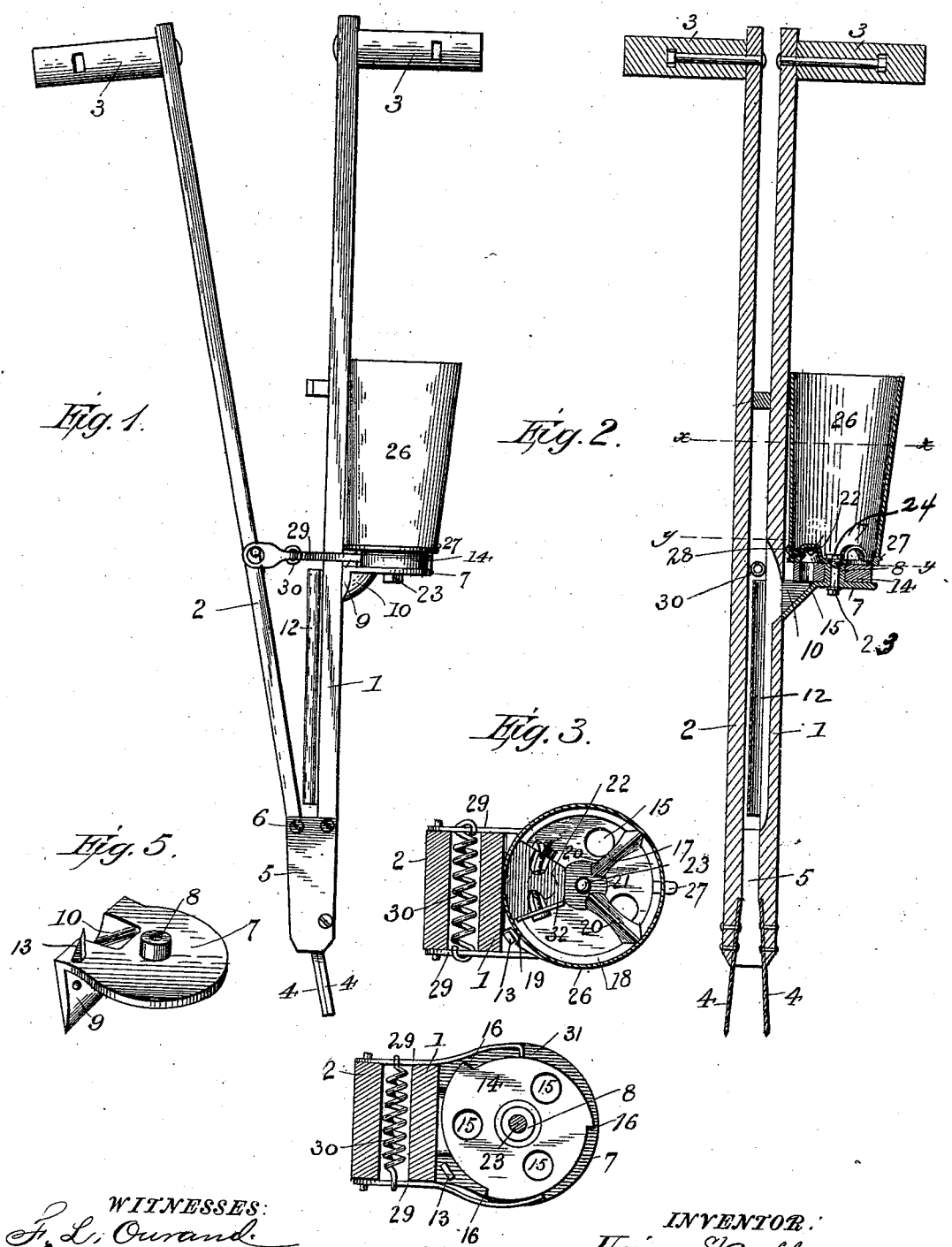

UNITED STATES PATENT OFFICE.

URIAS SHAEFFER, OF LANCASTER, OHIO.

CORN-PLANTER.

SPECIFICATION forming part of Letters Patent No. 512,626, dated January 9, 1894.

Application filed August 22, 1893. Serial No. 483,741. (No model.)

*To all whom it may concern:*

Be it known that I, URIAS SHAEFFER, a citizen of the United States, and a resident of Lancaster, in the county of Fairfield and State of Ohio, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification.

My invention relates to improvements in corn planters of that class or description known as rotary hand droppers; and its object is to provide a novel construction of the same which shall possess important advantages with respect to efficiency in operation.

The invention consists in the novel construction and combination of parts hereinafter described and claimed.

In the accompanying drawings: Figure 1 is a side elevation of a corn planter constructed in accordance with my invention. Fig. 2 is a central vertical section of the same. Fig. 3 is a horizontal section on the line $x$—$x$, Fig. 2. Fig. 4 is a similar section on the line $y$—$y$, Fig. 2. Fig. 5 is a detail perspective view of the casting.

In the said drawings, the reference numerals 1 and 2 designate two arms provided at their upper ends with handles 3, and at their lower ends with blades or sharpened plates 4, which are intended to be forced into the ground. The arm 1 is provided at its lower end with two plates 5, to which is pivoted at 6, the arm 2.

Intermediate of its ends, the leg 1 is provided with a casting 7 having a central hub 8, and a flange 9, by which it is secured to said leg by screws or other fastening devices. It is also formed with a seed chute 10, communicating with a spout 12, secured to the inner side of said leg and extending to the bottom thereof, and with a wedge-shaped projection 13.

Journaled on the hub 8 is a wheel or disk 14, formed with a series of seed cups 15, and its periphery with a number of ratchets 16, preferably corresponding with the number of seed cups.

Located upon the seed wheel is a vertically adjustable spider or frame 17, consisting of a rim 18 having peripheral lugs 19, radial arms 20, central hub 21, and web 22. This spider or frame is held in place by means of a headed bolt 23 and a nut 24, see Fig. 2, the wedge-shaped projection 13 engaging with the lug 19, preventing rotation of the same.

The numeral 26 designates a cylindrical hopper or grain receptacle secured to the spider or frame by means of a lug 27 passing through an aperture in the said receptacle and a rivet or bolt 28.

Pivoted to the leg 2 are two pawls 29, connected together by means of a coiled spring 30. One of these pawls is provided or formed with a hook 31 at its free end.

The operation will be readily understood: As the legs are alternately forced inward and outward, the pawls will engage with the ratchets of the seed wheel or disk intermittently rotating the same, one of said pawls engaging with the ratchets of said disk upon the inward stroke of the legs, and the other pawl, by means of its hooked end engaging therewith on the outward stroke, thus partially rotating said disk at each stroke. As the said disk rotates, the seed will drop into the seed cups which, when brought into coincidence with the chute 10, will allow the seed to drop thereinto and fall to the delivery spout. It will be noted that the web 22 is located directly over the chute and forms a housing thereof, being provided with india rubber cut offs or other plates 32.

The seed disk and spider are so constructed and arranged with respect to each other that the radial arms 20 register with the exposed seed cups when the blades 4 are driven into the ground, and thus prevent the grain in said cups from bouncing out.

The object of making the spider or frame and grain receptacle adjustable vertically, is to allow seed-disks of different thicknesses to be employed, consequently lengthening or shortening the seed cups, so as to allow them to receive a larger or smaller number of grains, the thinnest wheel used dropping one grain, and the thicker wheel, two or more grains.

Having thus described my invention, what I claim is—

In a rotary hand-planter, the combination with the pivoted legs, the seed-spout, the castings secured to one of said legs having a central hub, a seed chute and a wedge-shaped projection, the seed-disk provided with a series of seed-cups, and peripheral ratchets, the vertically adjustable spider comprising the rim, the lugs, the radial arms and the web, the bolt and nut for securing the same to the casting, the seed receptacle, the pawls pivoted to one of said legs, and the coiled spring connecting said pawls, all constructed and operating substantially as and for the purpose specified.

In testimony that I claim the foregoing as my own I have hereunto affixed my signature in presence of two witnesses.

URIAS SHAEFFER.

Witnesses:
JAS. HEWETSON PERRY JEFFRIES,
MELVILLE COOKMAN BRITTAIN.